United States Patent
Byun (10) Patent No.: US 8,748,030 B2
(45) Date of Patent: Jun. 10, 2014

(54) SECONDARY BATTERY

(75) Inventor: Sangwon Byun, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 420 days.

(21) Appl. No.: 13/151,550

(22) Filed: Jun. 2, 2011

(65) Prior Publication Data

US 2011/0305929 A1   Dec. 15, 2011

Related U.S. Application Data

(60) Provisional application No. 61/344,201, filed on Jun. 9, 2010.

(51) Int. Cl.
*H01M 2/26* (2006.01)
(52) U.S. Cl.
USPC ............................ 429/161; 429/163; 429/164
(58) Field of Classification Search
None
See application file for complete search history.

(56) References Cited

U.S. PATENT DOCUMENTS

| 6,346,344 | B1 | 2/2002 | Song et al. | |
|---|---|---|---|---|
| 2005/0084752 | A1* | 4/2005 | Kim | ............................. 429/185 |
| 2006/0121336 | A1 | 6/2006 | Yoon | |

FOREIGN PATENT DOCUMENTS

| CN | 201282158 Y | 7/2009 |
|---|---|---|
| EP | 2500959 A1 | 9/2012 |
| FR | 2743452 A1 | 7/1997 |
| JP | 05-062664 A | 3/1993 |
| JP | 07-105932 A | 4/1995 |
| JP | 08-153510 A | 6/1996 |
| JP | 10-284034 A | 10/1998 |
| JP | 2000-149918 A | 5/2000 |
| KR | 10-2000-0009698 A | 2/2000 |
| KR | 10-2002-0021888 A | 3/2002 |
| KR | 10-2006-0054635 A | 5/2006 |
| KR | 10-2009-0030162 A | 3/2009 |

OTHER PUBLICATIONS

Korean Notice of Allowance dated Aug. 29, 2013.
Chinese Office Action dated Jul. 26, 2013.
European Search Report dated Sep. 5, 2013.

* cited by examiner

*Primary Examiner* — Cynthia K. Walls
(74) *Attorney, Agent, or Firm* — Lee & Morse, P.C.

(57) ABSTRACT

A battery includes a housing, the housing including an opening, an electrode assembly, the electrode assembly being disposed in an interior space of the housing, and a short-circuiting member including a first plate and second plate disposed proximate to the first plate, the first plate having an inverting portion and an edge portion, the inverting portion projecting toward an interior space of the housing, the edge portion including a fixed portion that is fixed to a periphery of the opening, and a recess in a surface of the edge portion that faces the interior space, at least a part of the recess overlapping the periphery of the opening.

18 Claims, 6 Drawing Sheets

SECONDARY BATTERY

CROSS-REFERENCE TO RELATED APPLICATION

This application claims priority to pending U.S. Provisional Application No. 61/344,201, filed in the U.S. Patent and Trademark Office on Jun. 9, 2010, and entitled "Secondary Battery," which is incorporated by reference herein in its entirety and for all purposes.

BACKGROUND

1. Field

Embodiments relate to a secondary battery.

2. Related Art

A rechargeable or secondary battery may be repeatedly charged and discharged. A low capacity battery pack having one unit battery inside may be used for, e.g., various portable compact electronic devices such as cellular phones or camcorders. A large capacity battery pack having, e.g., several tens of unit batteries connected together, may be used as, e.g., the power source for motor drive, such as in hybrid electric vehicles, etc.

SUMMARY

An embodiment is directed to a battery, including a housing, the housing including an opening, an electrode assembly, the electrode assembly being disposed in an interior space of the housing, and a short-circuiting member including a first plate and second plate disposed proximate to the first plate, the first plate having an inverting portion and an edge portion, the inverting portion projecting toward an interior space of the housing, the edge portion including a fixed portion that is fixed to a periphery of the opening, and a recess in a surface of the edge portion that faces the interior space, at least a part of the recess overlapping the periphery of the opening.

The fixed portion may be a welded portion.

The recess may be rectangular.

The recess may be tapered away from the interior space.

The recess may be triangular or trapezoidal.

The recess may be laterally spaced apart from the fixed portion.

The recess may be proximate to the fixed portion.

The recess may not overlap the fixed portion.

All of the recess may overlap the periphery of the opening.

The recess may be bounded by an inner part of the edge portion and an outer part of the edge portion, the inner part of the edge portion being between the inverting portion and the outer part of the edge portion, the outer part of the edge portion being between the recess and the fixed portion, and the inner part of the edge portion may contact the housing.

The periphery of the opening may include a step, and the edge portion may overlap the step.

A lateral extent of the recess may completely overlap the step.

The recess may be bounded by an inner part of the edge portion and an outer part of the edge portion, the inner part of the edge portion being between the inverting portion and the outer part of the edge portion, and the inner part of the edge portion may contact the step.

The housing may includes a case and a cap assembly, the opening may be located in the cap assembly, and the first plate may be fixed to the cap assembly.

The battery may include first and second terminals, the second plate being electrically connected to the first terminal, and the first plate being electrically connected to the second terminal, and the inverting portion may be configured to invert when the interior space of the housing reaches a predetermined pressure, the inverting portion being configured to electrically contact the second plate when the inverting portion inverts.

The first and second terminals may be charging terminals of opposite polarity, the first and second terminals being short-circuited by electrical contact between the second plate and the inverting portion when the inverting portion inverts.

At least one of the inverting portion and the second plate includes protrusions extending toward the other of the inverting portion and the second plate, the protrusions being configured to make electrical contact between the inverting portion and the second plate.

The second plate may include a hole above the inverting portion, the hole being configured to increase an area of electrical contact between the inverting portion and the second plate.

The inverting portion may be configured to invert when the interior space of the housing reaches a predetermined pressure, the first plate may seal the opening in the housing, the seal being maintained even if the inverting portion is inverted by the predetermined pressure, and the battery may further include a vent plate configured to vent pressure from inside the housing when the pressure inside the housing reaches a pressure at least as great as the predetermined pressure.

Another embodiment is directed to a vehicle, including a power source, the power source providing a motive power for the vehicle, and at least one battery configured to provide electricity to the power source, the battery including a housing, the housing including an opening, an electrode assembly, the electrode assembly being disposed in an interior space of the housing, and a short-circuiting member including a first plate and second plate disposed proximate to the first plate, the first plate having an inverting portion and an edge portion, the inverting portion projecting toward an interior space of the housing, the edge portion including a fixed portion that is fixed to a periphery of the opening, and a recess in a surface of the edge portion that faces the interior space, at least part of the recess overlapping the periphery of the opening.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, dimensions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two other elements, it can be the only elements between the two other elements, or one or more intervening elements may also be present. Like reference numerals refer to like elements throughout.

An embodiment relates to a secondary battery. The secondary battery may include a first short-circuiting plate having an inverting portion configured to be inverted under a predetermined condition, e.g., during high internal pressure resulting from, among other things, overcharging of the secondary battery. The secondary battery may also include a second short-circuiting plate configured to be short-circuited with the inverting portion when inverting of the inverting portion occurs. A notch may be formed on a bottom surface of an edge portion of the first short-circuiting plate. The bottom surface may abut onto a cap plate. The edge portion may couple the inverting portion to the cap plate. A welded portion at a periphery of the first short-circuiting plate may fix the first short-circuiting plate to the cap plate. In an implementation, a continuous weld may be present along the entire periphery of the first short-circuit plate, and the weld may seal the interface of the first short-circuiting plate and the cap plate.

The notch may be formed to be spaced apart from the welded portion. Accordingly, flexibility during an inverting operation may be provided to the inverting portion, thereby allowing the inverting portion to easily perform the inverting operation at a desired level of internal pressure. The inverting operation may thus be performed more precisely and more accurately.

In an embodiment, the secondary battery may include a hole and/or a protrusion at a region of the second short-circuiting plate corresponding to the inverting portion, thereby reducing contact resistance when the inverting portion performs an inverting operation, and allowing the inverting portion to make better electrical contact with the second short-circuiting plate.

A construction of a secondary battery 100 according to a first example embodiment will now be described.

Figure 1:
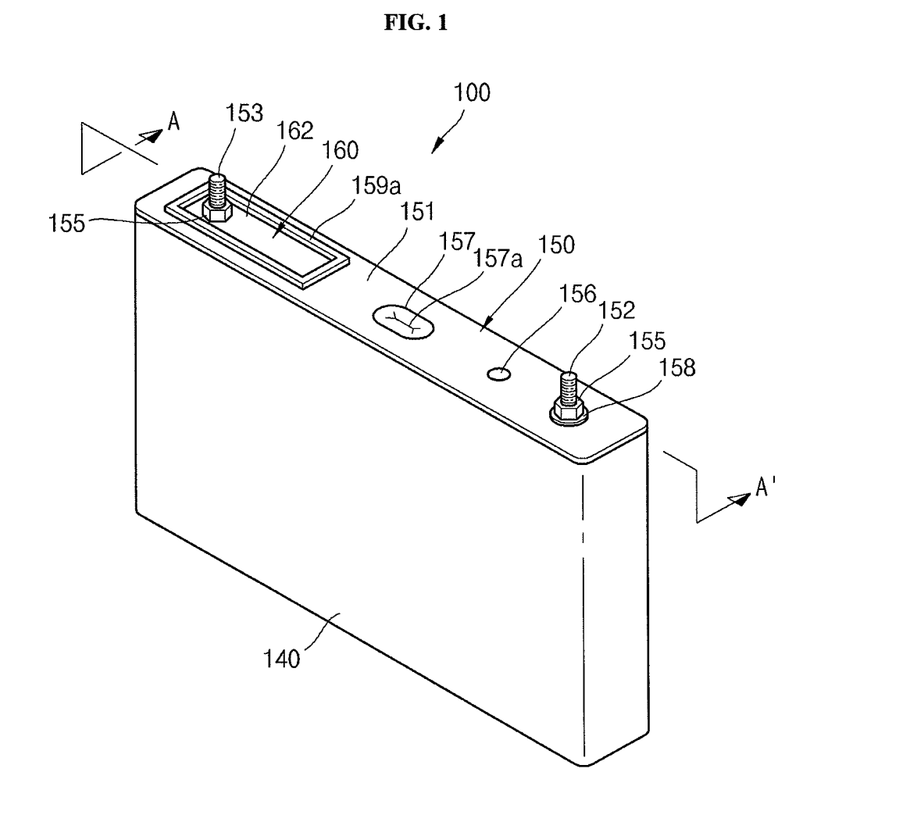
FIG. 1 illustrates a perspective view of a secondary battery according to a first example embodiment.
Figure 2:
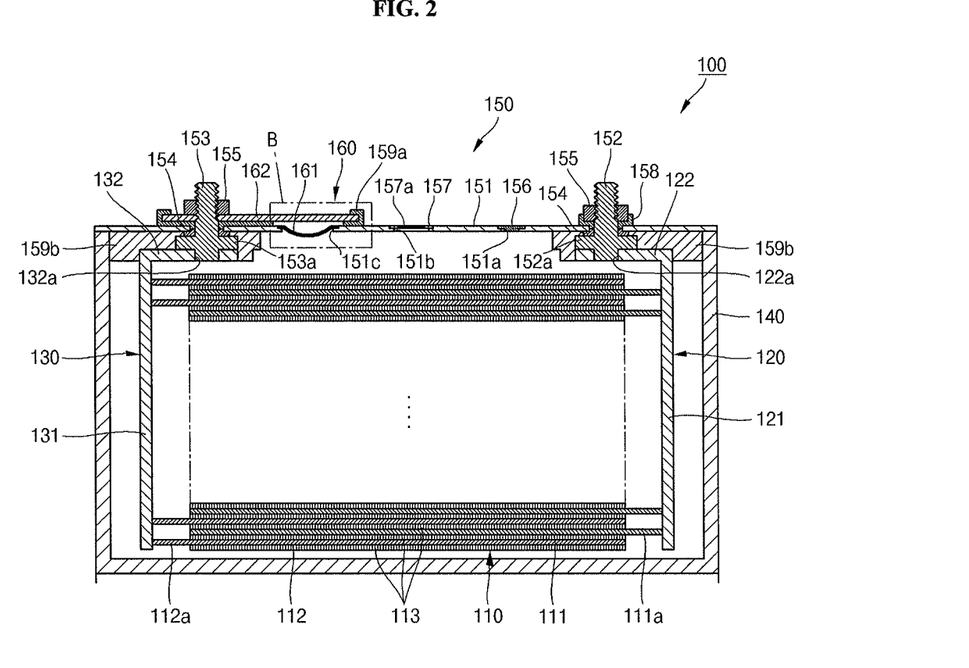
FIG. 2 illustrates a cross sectional view taken along a line A-A' of FIG. 1.
Figure 3A:
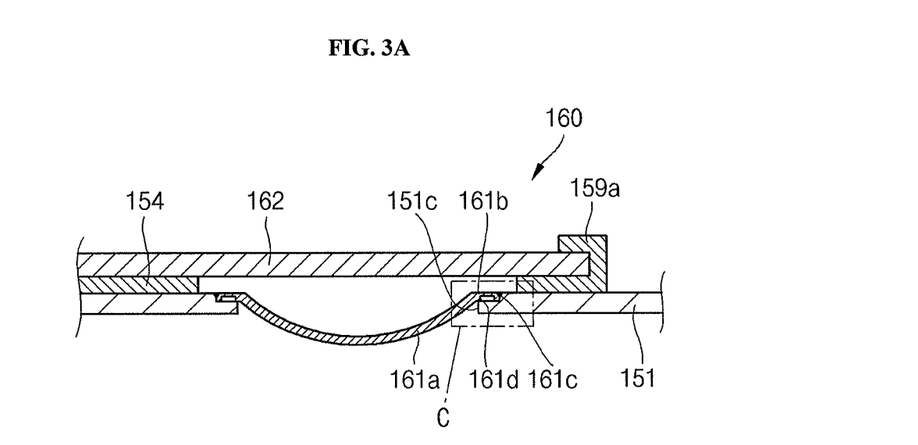
FIG. 3A illustrates a partially enlarged view of a portion "B" of FIG. 2.
Figure 3B:
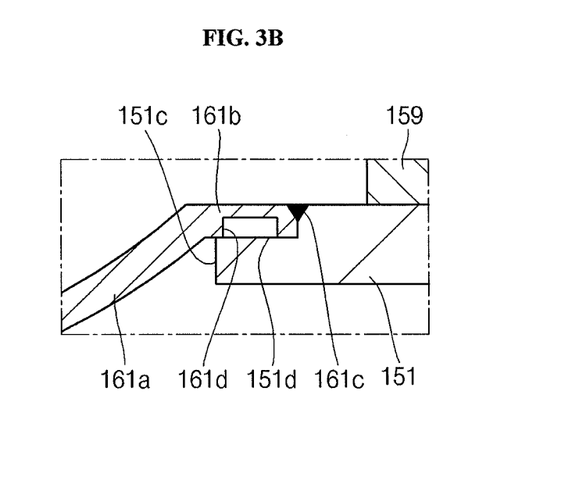
FIG. 3B illustrates a partially enlarged view of a portion "C" of FIG. 3A.
Figure 3C:
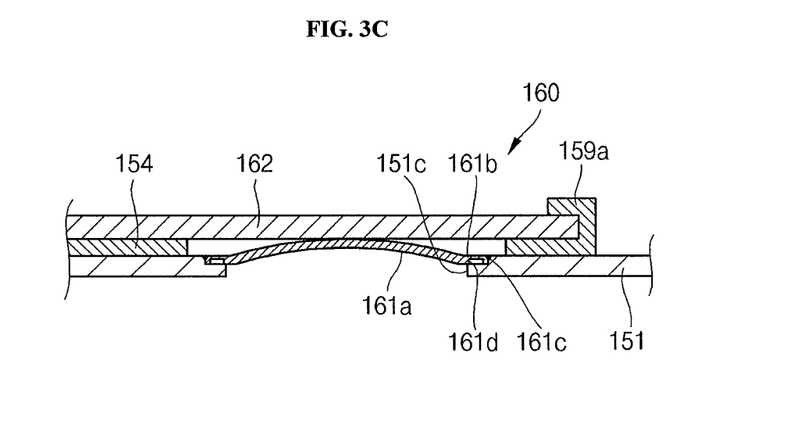
FIG. 3C illustrates a short-circuiting plate shown in FIG. 2 in an inverted state.

FIG. 1 illustrates a perspective view of the secondary battery 100 according to the first example embodiment, FIG. 2 illustrates a cross sectional view taken along a line A-A' of FIG. 1, FIG. 3A illustrates a partially enlarged view of a portion "B" of FIG. 2, FIG. 3B illustrates a partially enlarged view of a portion "C" of FIG. 3A, and FIG. 3C illustrates a short-circuiting plate shown in FIG. 2 in an inverted state.

Referring to FIGS. 1 through 3C, the secondary battery 100 according to the first example embodiment may include an electrode assembly 110, a first collector plate 120, a second collector plate 130, a case 140, a cap assembly 150, and a short-circuiting member 160.

The electrode assembly 110 may be formed by, e.g., winding or folding a stacked structure including a first electrode plate 111 shaped of a thin plate or foil, a second electrode plate 112, and a separator 113 interposed between the first electrode plate 111 and the second electrode plate. The first electrode plate 111 may be a positive electrode plate and the second electrode plate 112 may be a negative electrode plate. In another implementation, the first electrode plate 111 may be a negative electrode plate and the second electrode plate 112 may be a positive electrode plate.

The first electrode plate 111 may be formed by coating a first electrode active material, e.g., a transition metal oxide, on a first electrode collector made of a metal foil of, e.g., aluminum (Al). The first electrode plate 111 may include a first electrode uncoated portion 111a that is not coated with the first electrode active material. The first electrode uncoated portion 111a may provide for a current flow path between the first electrode plate 111 and elements connected to the first electrode plate 111.

The second electrode plate 112 may be formed by coating a second electrode active material, e.g., graphite or a carbon material, on a second electrode collector made of a metal foil of, e.g., nickel (Ni) or copper (Cu). The second electrode plate 112 may include a second electrode uncoated portion 112a that is not coated with the second electrode active material. The second electrode uncoated portion 112a may provide for a current flow path between the second electrode plate 112 and the outside of the second electrode plate 112.

The separator 113, positioned between the first electrode plate 111 and the second electrode plate 112, may prevent an electrical short therebetween while allowing for movement of lithium ions. The separator 113 may be formed of, e.g., polyethylene (PE), polypropylene (PP), or a composite film of PE and PP.

The first collector plate 120 may be formed of a conductive material, e.g., aluminum, and may contact the first electrode uncoated portion 111a (protruding to one end of the electrode assembly 110) so as to be electrically connected to the first electrode plate 111.

The first collector plate 120 may include a coupling portion 121 and a bent portion 122. The coupling portion 121 may be plate-shaped and may contact the first electrode uncoated portion 111a. The coupling portion 121 may be electrically connected to the first electrode uncoated portion 111a to provide an electrical path allowing the first electrode uncoated portion 111a to be connected to the outside.

The bent portion 122 may a plate bent from the coupling portion 121 at approximately 90 degrees, and may be installed between an upper portion of the electrode assembly 110 and the cap assembly 150. The bent portion 122 may include a terminal hole 122a formed therein. The terminal hole 122a may be formed at one side of the bent portion 122 to provide a space for a first electrode terminal 152.

The second collector plate 130 may be formed of a conductive material, e.g., nickel, and may contact the second electrode uncoated portion 112a (protruding to the other end of the electrode assembly 110) so as to be electrically connected to the second electrode plate 112. The second collector plate 130 may include a coupling portion 131 and a bent portion 132. The bent portion 132 may include a terminal hole 132a to provide a space for a second electrode terminal 153a. The coupling portion 131, the bent portion 132, and the terminal hole 132a of the second collector plate 130 may have substantially the same configurations and functions as those of the coupling portion 121, the bent portion 122, and the terminal hole 122a of the first collector plate 120, and thus repeated explanations thereof will be omitted.

The case 140 may be formed of, e.g., a conductive metal such as aluminum, aluminum alloy, or nickel-plated steel, and may be prismatic with an approximately rectangular parallelepiped shape. The case 140 may define an opening through which the electrode assembly 110, the first collector plate 120, and the second collector plate 130 are placed in the case 140. In FIG. 2, the case 140 and the cap assembly 150 are coupled to each other; the opening corresponds to an upper peripheral portion of the cap assembly 150. The case 140 may have insulation at an internal surface thereof, so that the case 140 is insulated from the electrode assembly 110, the first collector plate 120, the second collector plate 130, and the cap assembly 150. The case 140 may function as an electrode having a polarity, for example, a cathode.

The battery 100 may have a housing including the case 140 with the cap assembly 150 coupled thereto. The battery 100 may include a cap plate 151, a first electrode terminal 152, a second electrode terminal 153, a gasket 154, and a nut 155. In addition, the cap assembly 150 may include a plug 156, a vent plate 157, a connection plate 158, an upper insulation member 159a, and a lower insulation member 159b.

The cap plate 151 may seal the opening of the case 140 and may be formed of the same material as the case 140. The cap plate 151 may include an electrolyte injection hole 151a and a vent hole 151b. The battery housing may have a short-circuiting hole 151c. The short circuiting hole 151c may be formed in the cap plate 151.

The first electrode terminal 152 may penetrate through one side of the cap plate 151 and may be electrically connected to the first collector plate 120. The first electrode terminal 152 may be formed in a columnar shape. A thread may be formed on the outer circumference of an upper part of the columnar-shaped first electrode terminal 152 that is exposed beyond the cap plate 151. A flange 152a may be formed at a lower part of the columnar-shaped first electrode terminal 152, positioned below the cap plate 151, so as to prevent the first electrode terminal 152 from slipping away from or pulling out of the cap plate 151. A portion of the first electrode terminal 152 that is positioned lower than the flange 152a may be fitted into the terminal hole 122a of the first collector plate 120. The first electrode terminal 152 may be electrically connected to the cap plate 151.

The second electrode terminal 153 may penetrate through the other side of the cap plate 151 and may be electrically connected to the second collector plate 130. The second electrode terminal 153 may have substantially the same configuration as the first electrode terminal 152. Thus, details thereof will not be repeated. The second electrode terminal 153 may be insulated from the cap plate 151.

The gasket 154 may be formed of an insulating material, and may be disposed between each of the first and second electrode terminals 152, 153 and the cap plate 151. The gasket 154 may seal a gap between each of the first and second electrode terminals 152, 153 and the cap plate 151. The gasket 154 may prevent external moisture from infiltrating into the secondary battery 100 and/or prevent the electrolyte injected into the secondary battery 100 from leaking out.

The nut 155 may be engaged with the thread formed in each of the first and second electrode terminals 152 and 153, and may fix the each of the first and second electrode terminals 152 and 153 on the cap plate 151.

The plug 156 may seal the electrolyte injection hole 151a of the cap plate 151. The vent plate 157 may be installed in the vent hole 151b of the cap plate 151. The vent plate 157 may include a notch 157a configured to be opened at a preset pressure.

The connection plate 158 may be configured such that the first electrode terminal 152 is fitted into a portion between the cap plate 151 and the first electrode terminal 152. The connection plate 158 may be kept in close contact with the cap plate 151 and the gasket 154 by the nut 155. The connection plate 158 may electrically connect the cap plate 151 and the first electrode terminal 152 to each other.

The upper insulation member 159a may be configured such that the second electrode terminal 153 is fitted into a portion between the cap plate 151 and the second electrode terminal 153. The upper insulation member 159a may closely contact the cap plate 151 and the gasket 154. The upper insulation member 159a may electrically insulate the cap plate 151 and the second electrode terminal 153 from each other.

The lower insulation member 159b may be disposed between each of the first collector plate 120 and the second collector plate 130 and the cap plate 151 to prevent an electric short from occurring therebetween.

The short-circuiting member 160 may be installed at an upper portion of the cap assembly 150. When an internal pressure of the secondary battery 100 is greater than a reference pressure, due to, e.g., overcharging, the short-circuiting member 160 may induce a short-circuit to interrupt the flow of charging current. In an implementation, the reference pressure at which the short-circuiting member 160 induces short-circuiting may be less than the preset pressure at which the notch 157a of the vent plate 157 opens.

The short-circuiting member 160 may include first and second short-circuiting plates 161 and 162, both of which may be made of a conductive material. The first short-circuiting plate 161 may cover the short-circuiting hole 151c of the cap plate 151. The first short-circuiting plate 161 may be electrically connected to the cap plate 151. The first short-circuiting plate 161 may be formed of, e.g., aluminum.

The inverting portion 161 a may be formed to have an inwardly convex shape with respect to the case 140, i.e., a central portion of the inverting portion 161a may project toward the inner space of the battery relative to peripheral portions of the inverting portion 161a, e.g., as shown in FIG. 2. When the internal pressure of the secondary battery 100 is greater than the reference pressure, the short-circuiting plate 161 may be inverted into an upwardly convex shape to then be electrically connected to the second short-circuiting plate 162.

The first short-circuiting plate 161 may be formed as an inversion plate including a inverting portion 161a formed to be downwardly convex (prior to being inverted) and an edge portion 161b to be fixed at the edge of the short-circuiting hole 151c. In an implementation, the periphery of the short-circuiting hole 151c in the cap plate 151 may have a ledge or step 151d. In another implementation, the cap plate 151 may not have a step. The edge portion 161b of the first short-circuiting plate 161 may be set in the step 151d. In an implementation, the step 151d may have a depth substantially the same as a thickness of the edge portion 161b, such that an upper surface of the first short-circuiting plate 161 is approximately coplanar with an upper surface of the cap plate 151.

The inverting portion 161a may cover the short-circuiting hole 151c of the cap plate 151, and may hermetically seal the short-circuiting hole 151c.

The inverting portion 161a may have a predetermined extent of elasticity, and may be inverted when the internal pressure of the case 140 exceeds the reference pressure. In a normal state, the inverting portion 161 a may be electrically connected to the cap plate 151 but separated from, and thus electrically isolated from, the second short-circuiting plate 162. However, when the inverting portion 161a is inverted, an upper part of the inverting portion 161a may come into electrical contact with the second short-circuiting plate 162, thereby electrically connecting the cap plate 151 and the second short-circuiting plate 162 to each other.

With the cap plate 151 connected to the positive electrode terminal 152, and the second short-circuiting plate 162 connected to the negative electrode terminal 153, the positive electrode terminal 152 and the negative electrode terminal 153 may thus be electrically connected to each other upon inverting of the inverting portion 161a and resultant contact between the inverting portion 161a and the second short-circuiting plate 162. Thus, a charging operation at the positive electrode terminal 152 and the negative electrode terminal 153 may be terminated, so that the internal pressure of the case 140 is prevented from further increasing, thereby protecting the secondary battery 100 from a potentially dangerous increase in internal pressure.

The edge portion 161b may be formed at the edge of the inverting portion 161a. The edge portion 161b may be used to fix the inverting portion 161a to the cap plate 151. Even when the inverting portion 161a is inverted, the edge portion 161b may securely fix the inverting portion 161a. In an implementation, the first short-circuiting plate 161 may seal the short-circuiting hole 151c and maintain the seal even after being inverted.

The edge portion 161b may have a fixed portion that fixes it to the cap plate. For example, a welded portion 161c may be formed at a lateral boundary abutting onto the cap plate 151. The welded portion 161c may be formed by, e.g. pulse welding, or by continuous welding, which has a higher welding intensity than pulse welding. The welding process for forming the welded portion 161c may be performed from a top end of the lateral boundary where the cap plate 151 and the edge portion 161b come into contact with each other. Accordingly, the welded portion 161c may be configured such that a width of the welded portion 161c is relatively large at the top end of the lateral boundary and tapers away from the top end. The welded portion 161c may have an inverted triangular shape.

The edge portion 161b may have a recess to provide flexibility. For example, a notch 161d may be formed on the bottom surface of the edge portion 161b. The notch 161d may be formed at an inner portion of the edge portion 161b abutting onto the cap plate 151. In an embodiment, the notch may have a rectangular cross section. The notch 161d may reduce a contact area between the bottom surface of the edge portion 161b and the cap plate 151. The edge portion 161b may provide flexibility to the inverting portion 161a during inverting, thereby allowing the inverting portion 161a to easily invert when the battery 100 reaches a predetermined level of internal pressure, which may ultimately increase the reliability of the secondary battery 100.

The notch 161d may be located out of a region where the welded portion 161c is formed. The welded portion 161c may have a relatively large width at its upper portion and a relatively small width at its lower portion (see, e.g., FIG. 3B, showing the welded portion 161c as viewed from a cross section of the edge portion 161b). Also, the notch 161d may be formed to be directed toward the inside of the edge portion 161b from the bottom surface of the edge portion 161b, i.e., the notch 161d may be formed as a recess in the underside of the edge portion 161b. The notch 161d may be spaced, both vertically and horizontally, away from the welded portion 161c. Therefore, the notch 161d may avoid geometrically interfering with or complicating a welding process used to form the welded portion 161c. Conversely, when the notch 161d moves during the inverting operation of the inverting portion 161a, it may not be interfered with or retarded by the welded portion 161b. Accordingly, the notch 161d may provide flexibility to the inverting portion 161a independent of the welded portion 161b.

The second short-circuiting plate 162 may be formed so as to receive the second electrode terminal 153 therethrough. The second short-circuiting plate 162 may be spaced apart from the cap plate 151 and may extend so as to cover an upper part of the short-circuiting hole 151c. The second short-circuiting plate 162 may be electrically connected to the second electrode terminal 153. The second short-circuiting plate 162 may have flat top and bottom surfaces. The second short-circuiting plate 162 may be formed of, e.g., copper.

As described above, in the secondary battery 100 according to the first example embodiment, the notch 161d may be formed on a bottom surface of the first short-circuiting plate 161, an edge portion of which abuts onto the cap plate 151, and the notch 161d may be formed to be spaced apart from the welded portion 161c to provide flexibility to the inverting portion 161a during an inverting operation, thereby allowing the inverting portion 161a to easily perform the inverting operation at a desired level of internal pressure.

Figure 4A:
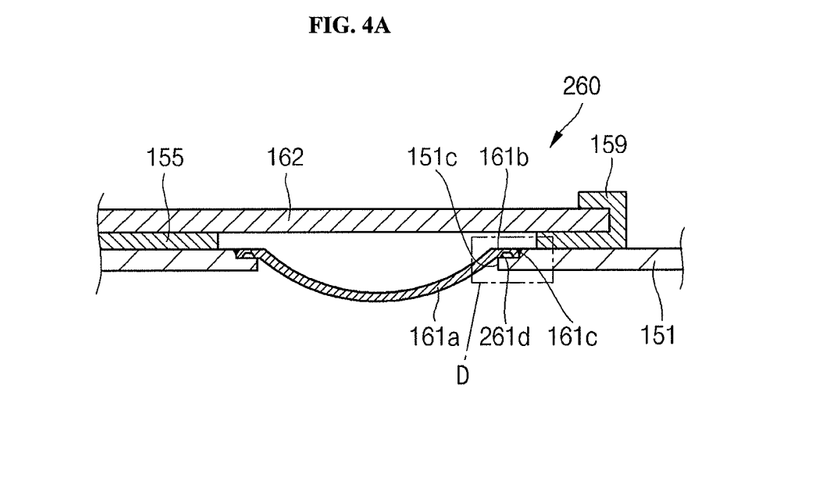
FIG. 4A illustrates an enlarged view of a short-circuiting plate of a secondary battery according to a second example embodiment.
Figure 4B:
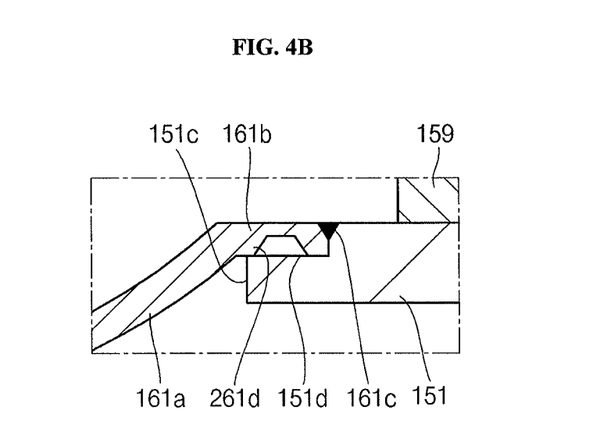
FIG. 4B illustrates a partially enlarged view of a portion "D" of FIG. 4A.

FIG. 4A illustrates an enlarged view of a short-circuiting member 260 of a secondary battery according to the second example embodiment, and FIG. 4B illustrates a partially enlarged view of a portion "D" of FIG. 4A.

The secondary battery may include the electrode assembly, the first collector plate, the second collector plate, the case, and the cap assembly, which are the same as the corresponding elements of the battery 100 described above. As such, details thereof will not be repeated. Portions having the same configuration and functions as those of the first embodiment are designated by the same reference numerals, and a description will be mainly made below with emphasis placed on differences.

According to the second embodiment, the secondary battery may include the short-circuiting member 260 shown in FIGS. 4A and 4B. The short-circuiting member 260 may be formed at an upper part of the cap assembly 150. The short-circuiting member 260 may induce a short circuit when an internal pressure of the secondary battery is greater than a predetermined or reference pressure.

The short-circuiting member 260 may include the second short-circuiting plate 162, which is the same as the corresponding element of the previous embodiment in view of configuration and operation.

The short-circuiting member 260 may include the first short-circuiting plate 161. The first short-circuiting plate 161 may include the inverting portion 161a and the edge portion 161b. The inverting portion 161a is the same as the corresponding element above in view of configuration and operation. The edge portion 161b may have the welded portion 161c formed at a lateral boundary abutting onto the cap plate 151. In addition, the edge portion 161b may have a notch 261d formed on its bottom surface abutting onto the cap plate 151.

The notch 261d may be formed to have a trapezoidal cross section at an inner portion of the edge portion 161b. The trapezoidal shape may be formed such that its bottom side (positioned along the bottom surface of the edge portion 161b) is relatively long and its top side (positioned inside the edge portion 161c) is relatively short. By contrast, a width of the welded portion 161c may be relatively large at the top end of the edge portion 161b and taper away from the top end of the edge portion 161b. Thus, the notch 261d may be formed to be out of the way of welded portion 161c so as not to contact the welded portion 161c, thereby preventing geometrical interference during a welding process. In addition, sizes of the notch 261d may be adjusted to have a desired size, irrespective of the welded portion 161c. Further, greater flexibility of the inverting portion 161a may be provided during inverting by increasing a length of the bottom side of the notch 161c.

Figure 5A:
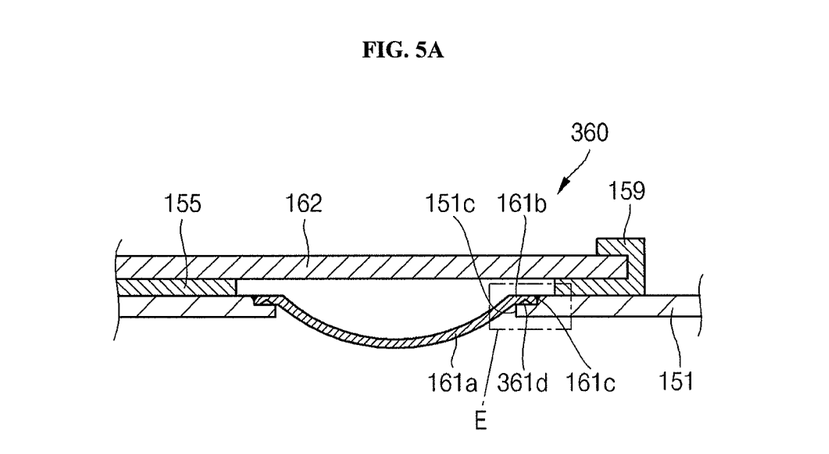
FIG. 5A illustrates an enlarged view of a short-circuiting plate of a secondary battery according to a third example embodiment.
Figure 5B:
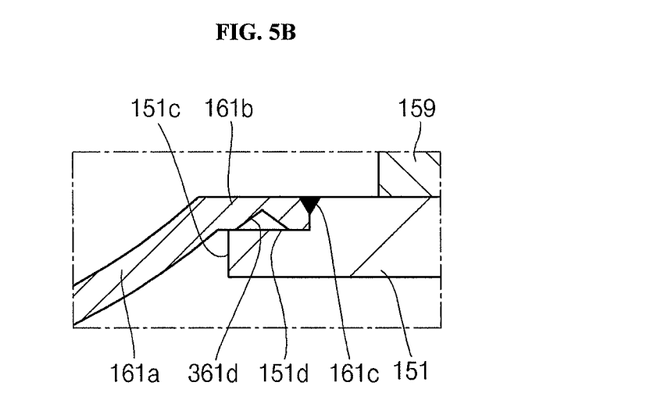
FIG. 5B illustrates a partially enlarged view of a portion "E" of FIG. 5A.

FIG. 5A illustrates an enlarged view of a short-circuiting member 360 of a secondary battery according to the third example embodiment, and FIG. 5B illustrates a partially enlarged view of a portion "E" of FIG. 5A.

The secondary battery may include the electrode assembly, the first collector plate, the second collector plate, the case, and the cap assembly, which are the same as the corresponding elements of the secondary battery 100 described above. As such, details thereof will not be repeated. Portions having the same configuration and functions as those of the first embodiment are designated by the same reference numerals, and a description will be mainly made below with emphasis placed on differences.

According to the third embodiment, the secondary battery may include the short-circuiting member 360 shown in FIGS. 5A and 5B. The short-circuiting member 360 may include the second short-circuiting plate 162, which is the same as the corresponding element of the first example embodiment in view of configuration and operation.

The short-circuiting member 360 may include the first short-circuiting plate 161. The first short-circuiting plate 161 may include the inverting portion 161a and the edge portion 161b. The inverting portion 161a is the same as the corresponding element in the first example embodiment in view of configuration and operation. The edge portion 161b may have the welded portion 161c formed at a lateral boundary abutting onto the cap plate 151. In addition, the edge portion 161b may have a notch 361d formed on its bottom surface abutting onto the cap plate 151.

The notch 361d may be formed to have a triangular cross section at an inner portion of the edge portion 161b. The triangular shape may be formed such that its bottom side is positioned along the bottom surface of the edge portion 161b and its vertex is formed at the inner portion of the edge portion 161b. Thus, the notch 361d may be formed to be out of the way of the welded portion 161c so as not to contact the welded portion 161c, thereby preventing geometrical interference during a welding process. In addition, sizes of the notch 361d may be adjusted to have a desired size, irrespective of the welded portion 161c. Further, greater flexibility of the inverting portion 161a may be provided during inverting by increasing a length of the bottom side of the notch 361d.

Figure 6A:
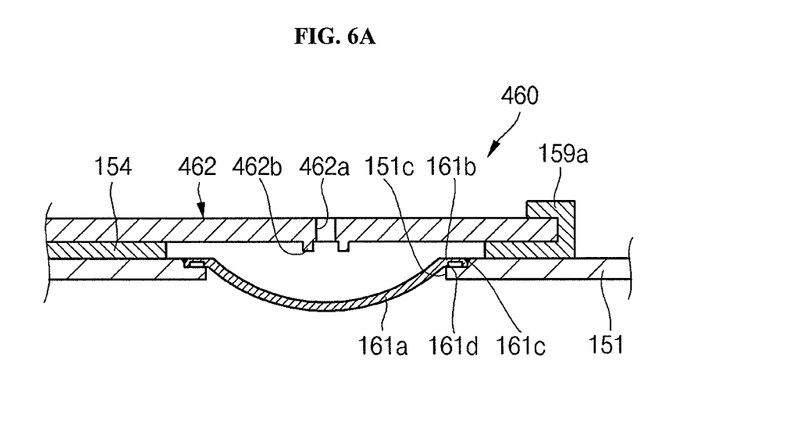
FIG. 6A illustrates an enlarged view of a short-circuiting plate of a secondary battery according to a fourth example embodiment.
Figure 6B:
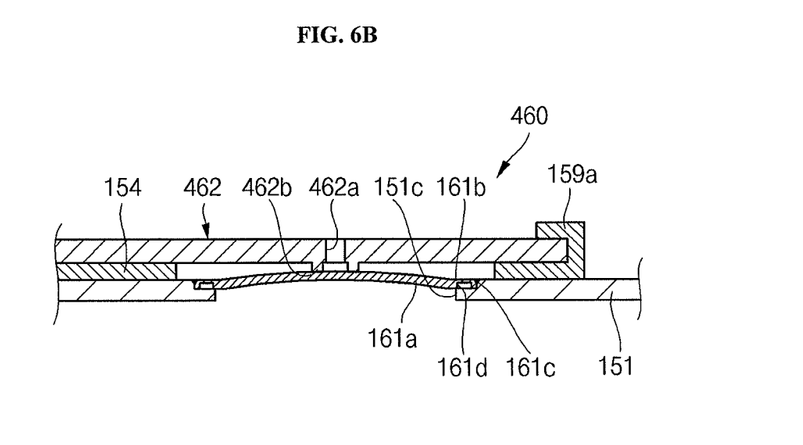
FIG. 6B illustrates a state in which the short-circuiting plate shown in FIG. 6A is inverted.

FIG. 6A illustrates an enlarged view of a short-circuiting member 460 of a secondary battery according to a fourth example embodiment, and FIG. 6B illustrates a state in which the short-circuiting plate shown in FIG. 6A is inverted.

The secondary battery may include the electrode assembly, the first collector plate, the second collector plate, the case, and the cap assembly, which are the same as the corresponding elements of the secondary battery 100 described above. As such, details thereof will not be repeated. Portions having the same configuration and functions as those of the first embodiment are designated by the same reference numerals, and a description will be mainly made below with emphasis placed on differences.

According to the fourth embodiment, the secondary battery may include the short-circuiting member 460 shown in FIGS. 6A and 6B. The short-circuiting member 460 may include the first short-circuiting plate 161, which may have any of the configurations described above in connection with the first through third embodiments. Referring to FIG. 6A, the short-circuiting member 460 may also include a second short-circuiting plate 462.

The second short-circuiting plate 462 may include one or both of a hole 462a and a protrusion 462b formed at a region corresponding to the inverting portion 161a of the first short-circuiting plate 161. When a short-circuit occurs due to contact between the first short-circuiting plate 161 and the second short-circuiting plate 462, the hole 462a may function to maintain the flow of current at a uniform level. In this regard, resistance may rise at a contact area between the first short-circuiting plate 161 and the second short-circuiting plate 462. In such an event, the hole 462a may increase the contact area between the first short-circuiting plate 161 and the second short-circuiting plate 462, thereby reducing the resistance at the contact area between the inverting portion 161a of the first short-circuiting plate 161 and the second short-circuiting plate 462.

As another example, the protrusion 462b may be formed on a surface opposite to and facing the inverting portion 161a of the first short-circuiting plate 161. The protrusion 462b may be located in the same vicinity as the hole 462a just described. The protrusion 462b may reduce a distance between the first short-circuiting plate 161 and the second short-circuiting plate 462. When the inverting portion 161a of the first short-circuiting plate 161 is inverted and comes into contact with the protrusion 462b of the second short-circuiting plate 462, the protrusion 462b may make the first short-circuiting plate 161 and the second short-circuiting plate 462 contact each other in a more secured manner.

Figure 7:
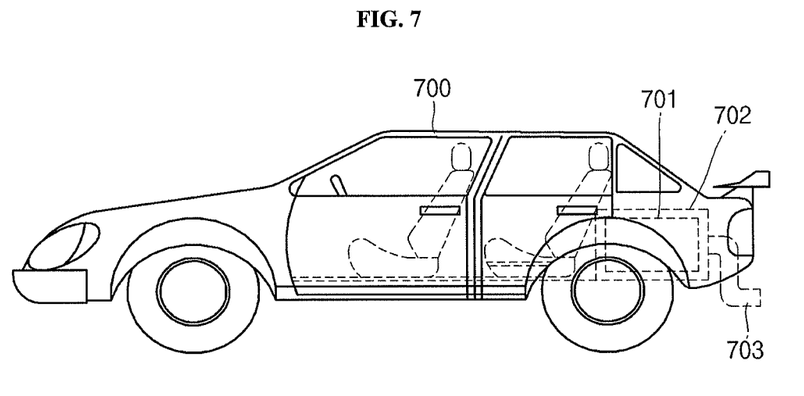
FIG. 7 illustrates a schematic diagram of a vehicle including a secondary battery according to a fifth embodiment.

FIG. 7 illustrates a schematic diagram of a vehicle 700 including a secondary battery according to a fifth embodiment. The vehicle 700 may be an electric vehicle or a hybrid vehicle, e.g., a plug-in electric car, motorcycle, bicycle, scooter, etc., a gas- or diesel-electric hybrid car, motorcycle, bicycle, scooter, etc., and the like, whether carrying passengers or cargo/equipment, and whether human controlled, automated, robotic, etc. The electric vehicle may use an electric engine that is powered by electrical energy output from a battery. The electric vehicle may use one or more batteries according to an embodiment to provide power, e.g., as a main power source and/or a backup power source. The hybrid vehicle may use two or more kinds of power sources, for example, an internal combustion engine and an electric motor, to provide motive power. In another implementation, the internal combustion engine may be used only to generate electricity. In another implementation, a fuel cell, e.g., a hydrogen-powered fuel cell, may be used to generate electricity.

A plurality of secondary batteries 100 may be configured as a battery pack 701 that provides electricity to and/or receives electricity from the power source. The secondary battery 100, or plurality thereof, may be housed in a carrier 702, which may include a vent 703 to release gases, provide air flow to the secondary battery, etc.

As described above, embodiments may provide a battery that can be protected by inducing a short circuit between electrodes when an internal pressure of a case increases. The secondary battery may be manufactured in various shapes, including, e.g., a cylindrical type, a prismatic type, etc. The secondary battery is generally constructed by accommodating an electrode assembly in a case together with an electrolyte, the electrode assembly including a separator serving as an insulator between a positive electrode plate and a negative electrode plate, and then coupling a cap assembly having electrode terminals to the case.

When an excessively high heat is generated due to, for example, overcharging, or when the electrolyte is decomposed, the internal pressure may increase, potentially resulting in fire or explosion. As described above, embodiments relate to a secondary battery configured to have improved safety. The secondary battery may be structured to circumvent problems, e.g., uncontrolled internal pressure increases, that may result from overcharging by, e.g., controlling or venting the internal pressure and short-circuiting the charging operation.

The battery may include an electrode assembly, a case accommodating the electrode assembly, a cap assembly sealing the case and including a cap plate having a short-circuiting hole, a first short-circuiting plate including an inverting portion and an edge portion, the inverting portion formed in the short-circuiting hole and formed to be bent toward the case and the edge portion formed at the edge of the inverting portion and coupled to the cap plate, and a second short-circuiting plate formed at an upper part of the cap plate to be spaced apart from the cap plate so as to cover the short-circuiting hole, wherein the edge portion includes a notch formed at its bottom surface connected to the cap plate.

The notch may have a cross section such as a rectangular shape, a trapezoidal shape, or a triangular shape. The notch may be spaced apart from a welded portion for coupling the edge portion to the cap plate. The second short-circuiting plate may include a hole at a region corresponding to the inverting portion. In addition, the second short-circuiting plate may further include a protrusion formed along the edge of the hole so as to be directed toward the inverting portion. The resistance at the contact area between the inverting portion and the second short-circuiting plate may thus be reduced.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery, comprising:
a housing including a case and a cap assembly,
wherein the cap assembly includes an opening;
an electrode assembly, the electrode assembly being disposed in an interior space of the housing; and
a short-circuiting member including a first plate and second plate disposed opposite to the first plate, the first plate having an inverting portion and an edge portion, the inverting portion projecting toward an interior space of the housing, the edge portion including:
a fixed portion that is fixed to a periphery of the opening, and
a recess in a surface of the edge portion that faces the interior space, at least a part of the recess overlapping the periphery of the opening;
wherein:
the first plate is fixed to the cap assembly,
the battery includes first and second terminals, the second plate being electrically connected to the first terminal, and the first plate being electrically connected to the second terminal, and
the inverting portion is configured to invert when the interior space of the housing reaches a predetermined pressure, the inverting portion being configured to electrically contact the second plate when the inverting portion inverts.

2. The battery as claimed in claim 1, wherein the fixed portion is fixed to the periphery of the opening by a weld.

3. The battery as claimed in claim 1, wherein the recess is rectangular.

4. The battery as claimed in claim 1, wherein the recess is tapered away from the interior space.

5. The battery as claimed in claim 4, wherein the recess is triangular or trapezoidal.

6. The battery as claimed in claim 1, wherein the recess is laterally spaced apart from the fixed portion.

7. The battery as claimed in claim 6, wherein the recess is adjacent to the fixed portion.

8. The battery as claimed in claim 6, wherein the recess does not overlap the fixed portion.

9. The battery as claimed in claim 6, wherein all of the recess overlaps the periphery of the opening.

10. The battery as claimed in claim 9, wherein:
the recess is bounded by an inner part of the edge portion and an outer part of the edge portion, the inner part of the edge portion being between the inverting portion and the outer part of the edge portion, the outer part of the edge portion being between the recess and the fixed portion, and
the inner part of the edge portion contacts the housing.

11. The battery as claimed in claim 1, wherein:
the periphery of the opening includes a step, and
the edge portion overlaps the step.

12. The battery as claimed in claim 11, wherein a lateral extent of the recess completely overlaps the step.

13. The battery as claimed in claim 11, wherein:
the recess is bounded by an inner part of the edge portion and an outer part of the edge portion, the inner part of the edge portion being between the inverting portion and the outer part of the edge portion, and
the inner part of the edge portion contacts the step.

14. The battery as claimed in claim 1, wherein the first and second terminals are charging terminals of opposite polarity, the first and second terminals being short-circuited by electrical contact between the second plate and the inverting portion when the inverting portion inverts.

15. The battery as claimed in claim 1, wherein at least one of the inverting portion and the second plate includes protrusions extending toward the other of the inverting portion and the second plate, the protrusions being configured to make electrical contact between the inverting portion and the second plate.

16. The battery as claimed in claim 1, wherein the second plate includes a hole above the inverting portion, the hole being configured to increase an area of electrical contact between the inverting portion and the second plate.

17. The battery as claimed in claim 1, wherein:
the inverting portion is configured to invert when the interior space of the housing reaches a predetermined pressure,
the first plate seals the opening in the housing, the seal being maintained even if the inverting portion is inverted by the predetermined pressure, and the battery further comprises a vent plate configured to vent pressure from inside the housing when the pressure inside the housing reaches a pressure at least as great as the predetermined pressure.

18. A vehicle, comprising:
- a power source, the power source providing a motive power for the vehicle; and
- at least one battery configured to provide electricity to the power source, the battery including:
  - a housing including a case and a cap assembly, wherein the cap assembly includes an opening;
  - an electrode assembly, the electrode assembly being disposed in an interior space of the housing; and
  - a short-circuiting member including a first plate and second plate disposed opposite to the first plate, the first plate having an inverting portion and an edge portion, the inverting portion projecting toward an interior space of the housing, the edge portion including:
    - a fixed portion that is fixed to a periphery of the opening, and
    - a recess in a surface of the edge portion that faces the interior space, at least part of the recess overlapping the periphery of the opening,
  - wherein:
    - the first plate is fixed to the cap assembly,
    - the battery includes first and second terminals, the second plate being electrically connected to the first terminal, and the first plate being electrically connected to the second terminal, and
    - the inverting portion is configured to invert when the interior space of the housing reaches a predetermined pressure, the inverting portion being configured to electrically contact the second plate when the inverting portion inverts.

* * * * *